Figure 1:
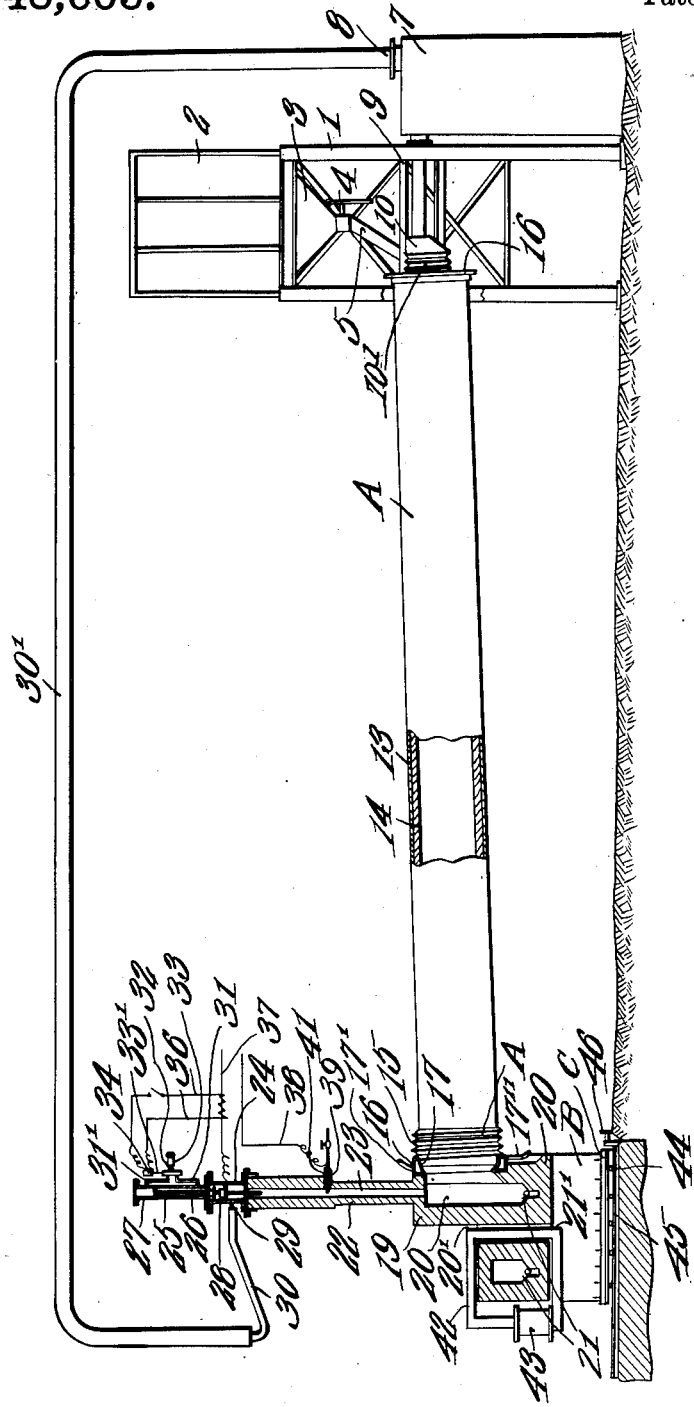

A. TOMMASINI.
HYDRO-ELECTRIC SMELTING FURNACE.
APPLICATION FILED AUG. 1, 1912.

1,048,603.

Patented Dec. 31, 1912.

4 SHEETS—SHEET 1.

Antonio Tommasini,
Inventor

Witnesses by C. A. Snow & Co.
Attorneys

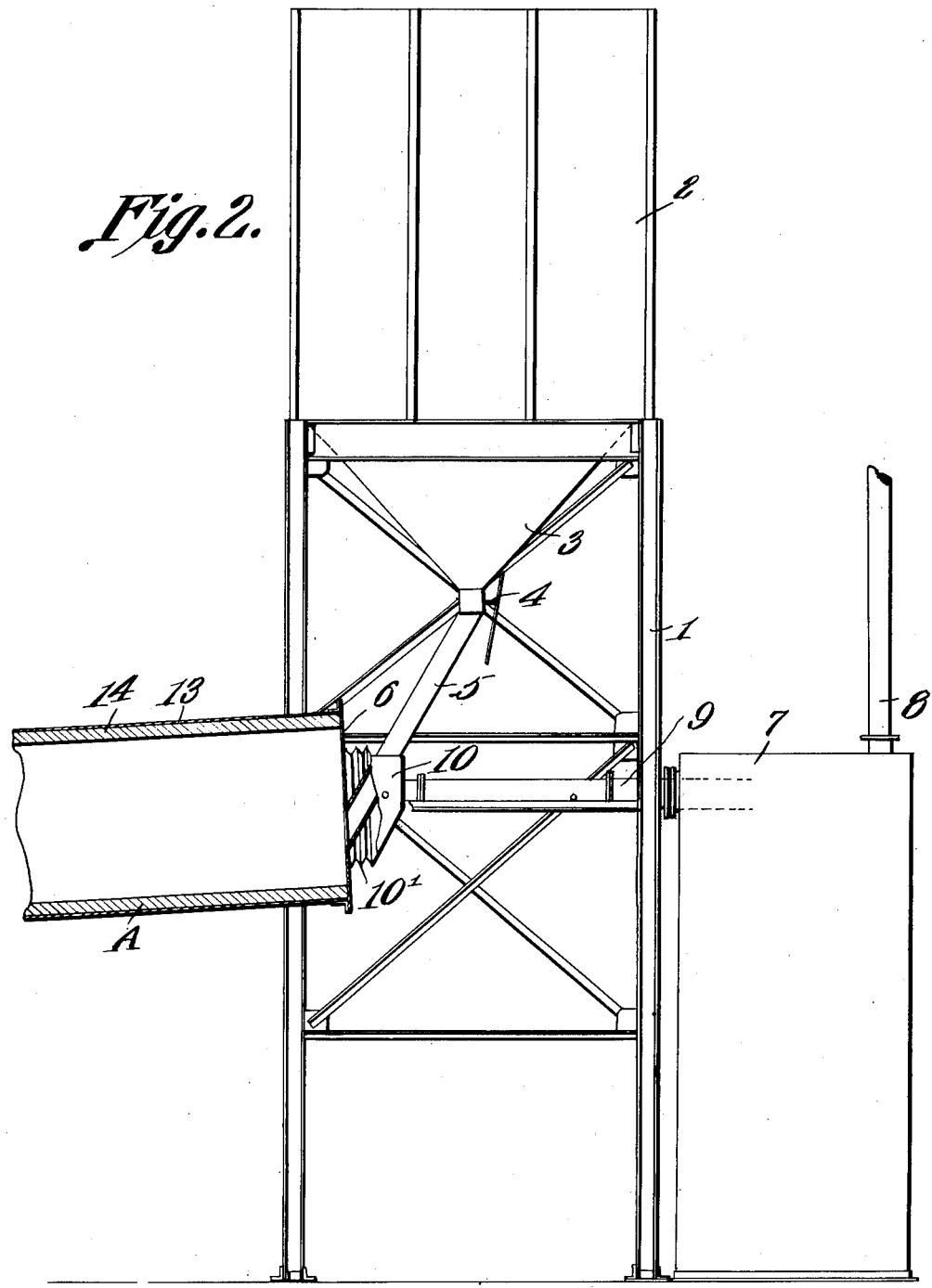

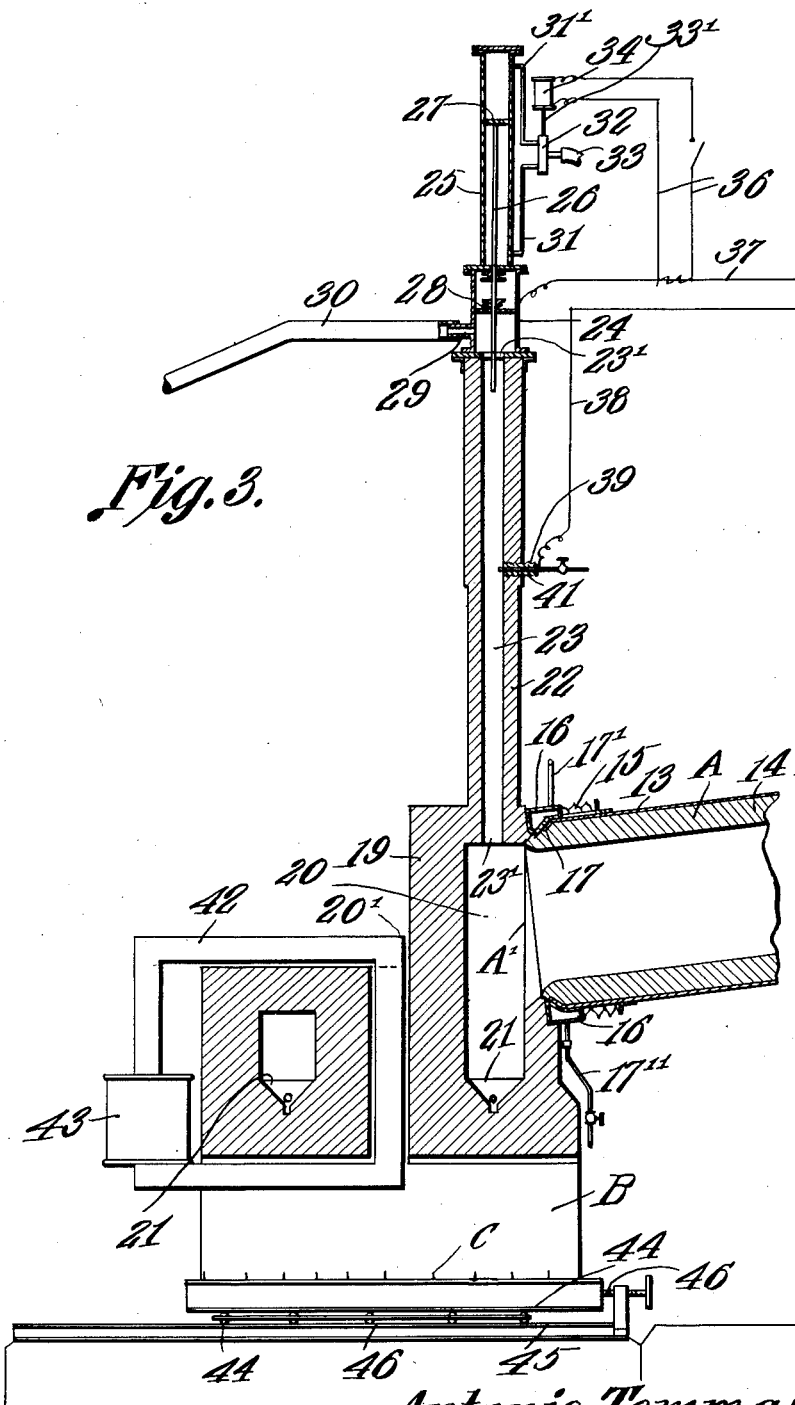

A. TOMMASINI.
HYDRO-ELECTRIC SMELTING FURNACE.
APPLICATION FILED AUG. 1, 1912.
1,048,603.
Patented Dec. 31, 1912.
4 SHEETS—SHEET 4.
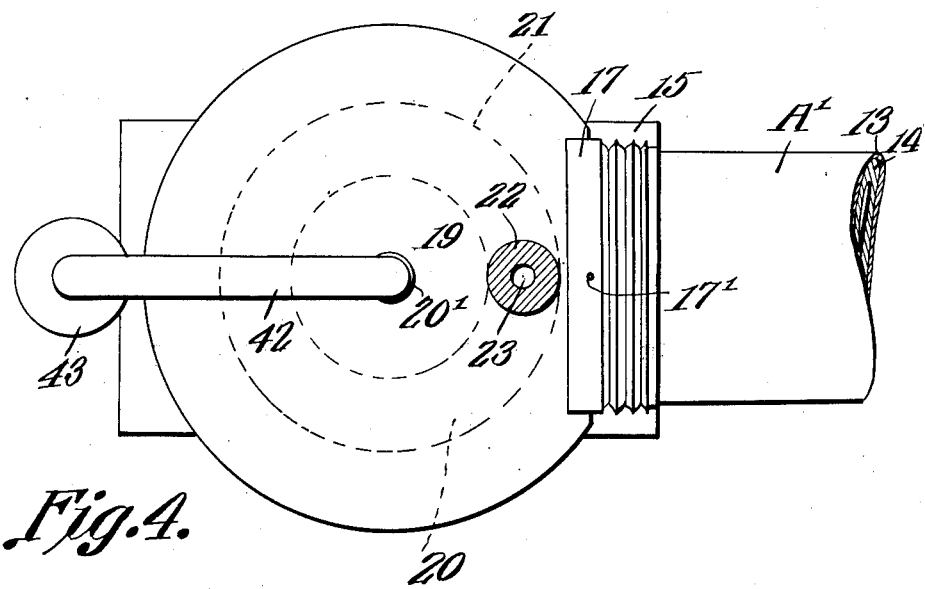

UNITED STATES PATENT OFFICE.

ANTONIO TOMMASINI, OF NEW YORK, N. Y., ASSIGNOR OF ONE-HALF TO MARCELLUS E. THORNTON, OF HICKORY, NORTH CAROLINA.

HYDRO-ELECTRIC SMELTING-FURNACE.

1,048,603.  Specification of Letters Patent.  Patented Dec. 31, 1912.

Application filed August 1, 1912. Serial No. 712,741.

*To all whom it may concern:*

Be it known that I, ANTONIO TOMMASINI, a citizen of the United States, residing at Brooklyn, New York city, in the county of Kings and State of New York, have invented a new and useful Hydro-Electric Smelting-Furnace, of which the following is a specification.

This invention relates to a smelting or reducing furnace for the purpose of smelting or reducing iron ores, or other metallic oxids.

In this furnace iron ore intimately mixed with proper fluxes is continuously agitated in the presence of highly heated hydrogen; the hydrogen gives up a portion of its heat to the ore mixture and thereby brings it up to the temperature of reaction; the molten iron and slag resulting from reaction flow into a crucible or reheater in which the iron is kept hot by electric currents induced therein, and the gaseous products of the reaction, consisting chiefly of hydrogen and water, vapor and steam, are passed through a condenser thereby condensing the steam and vapor and conveying the hydrogen back to the holder.

The hydrogen performs the double function of a reducing agent and heat carrier to the charge of ore and the flux and the surrounding container. This heat is imparted to the hydrogen in a specially devised furnace to be subsequently described. Therefore, this hydro-electric furnace is devised to employ electricity as the heating agent, and hydrogen as the reducing or chemical agent.

This hydro-electric furnace consists essentially of a rotatable inclined tubular hearth communicating at its upper end with suitable bins containing the ore and the fluxes, and a condenser for retrieving the hydrogen; and at its lower end communicating with a crucible or reheater for receiving the molten metal and slag from the hearth, and with an arc furnace for heating hydrogen before it reaches the hearth.

With the foregoing and other objects in view as will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings: Figure 1 is a side elevation of the furnace showing portions thereof in section. Fig. 2 is an enlarged sectional view of the upper end of the tubular hearth through which enters the charge from the bins and exits the gaseous products of reaction to the condenser. Fig. 3 is an enlarged sectional elevation of the lower end of the hearth, the receiving crucible or reheater, and the arc furnace which heats the hydrogen gas. Fig. 4 is a plan view of the re-heater and adjacent portion of the hearth. Fig. 5 is an enlarged sectional view of the elastic cylinder used in making a gas tight joint between the revolving and the stationary elements of this furnace.

The charge of ore and fluxing material in the bin 2, supported upon suitable frame work 1, passes through the hopper 3 into the chute 5, then through the casing 10 carrying the gas tight joint 10', into the tubular hearth A. The hearth is composed of the metallic cylindrical shell 13 lined with a refractory material 14, and is so mounted that it rotates about an inclined axis. By virtue of this rotation about an inclined axis the charge is moved and agitated toward the lower end of the hearth A. The hydrogen gas is heated in the arc furnace 22 to such a high temperature as and for the purpose of which will presently appear, that when it reaches the charge in the hearth it gives up a portion of its heat to the charge and surrounding hearth and thus their temperature is raised to the temperature of reaction. In this reaction the hydrogen combines with the oxygen of the ore to form super-heated steam and thereby setting the iron free in the form of molten iron. The impurities of the ore combine with the fluxes to form molten slags. In this reaction a chemical equilibrium takes place before all the hydogen has combined, so that much uncombined hydrogen will pass out of the hearth with the super-heated steam. To retrieve the hydrogen the gaseous products of the reaction pass from the hearth into a receiver or reservoir 7 where the steam is condensed and the hydrogen passes back to the holder. The molten iron and slags pass from the hearth A through the gas tight joint 15—17 into the crucible or re-heater 19 where the molten iron is kept hot by electric currents induced therein, as will be described. In the hearth the movement of the charge is so timed that the reaction takes place in the lower quarter of its length, and the reaction must be complete before reaching the lower end of hearth A. Under no circumstances, must any of the charge enter the re-heater 19. The hydrogen is heated in a separate furnace 22 shown for convenience above the re-heater, in which is caused to be established and maintained a long electric arc, around and coming in contact with which passes the hydrogen gas before admission to the hearth, thereby acquiring a very high temperature.

It is desirable that the hydrogen gas should be super-heated, the prefix "super" serving to indicate that the hydrogen gas is heated above the melting point of the metal used in the smelting operation as for instance taking it for granted that 2700° Fahr., will melt iron, the charge of iron entering the hearth at the temperature of the surrounding air or approximately at 60° Fahr., it being necessary that the charge of iron be heated to 2700° Fahr., and in order to accomplish this, the hydrogen gas must be heated to a temperature far in excess of 2700° Fahr., or roughly speaking, 6500° Fahr. Thus when the super-heated hydrogen gas comes in contact with the charge of iron at 60° Fahr., heat is given to the charge, thereby raising its temperature to 2700° Fahr., and at the same time the hydrogen gas by reason of having given up its heat to the charge, will be cooled down from 6500° to 2700° Fahr.

The charge passes from the bin 2 through the hopper 3, through the gate or valve 4, through the chute 5 which passes through the casing 10 into the upper end of the hearth A. The casing 10 is carried by the conduit 9 which is supported by the rollers on rails 9'. The casing 10 carries the lower half of the chute 5, and also carries an elastic cylinder 10' which carries a planed flange and keeps it in contact with and sliding upon the planed face 6 of the end frame of the hearth A. This construction facilitates the moving away of casing 10 from the end of hearth A and allows admission therein for inspection and repairs.

In Fig. 3 is shown on a large scale and in detail section the hydrogen heating furnace 22 and the crucible or re-heater 19. The heating furnace 22 is composed of a tubular chamber having a fixed electrode 41 in the insulating bushing 39, this electrode being situated at the discharge end of the chamber; and a movable electrode 26 carried by the piston 27 of a pneumatic or hydraulic engine 25 situated at the inlet end of the chamber. The inlet end of the chamber 22 is capped or surmounted by a casing 24 which carries a cylinder 25. A piston 27 in the cylinder 25 actuates the rod 26 which passes through suitable stuffing boxes in the chamber 23'. The movable electrode 26 is carried by this piston rod. The rubber tube 30 and pipe 29 serve to conduct the hydrogen to the chamber 23 where it comes in contact with the arc and then passes through chamber 23 to the lower end of hearth A. The valve 32 controls the admission of pressure to and the release of pressure from either side of the piston 27, and said valve 32 is operably connected to the electro-magnet 34 which is controlled directly or indirectly by the current flowing through the main circuit 37—38.

When the circuit in 37—38 is broken, the electro-magnet 34 releases the valve 32 which moves so as to admit pressure to the cylinder and to cause the piston 27 to move the rod 26 toward the fixed electrode 24 and thereby establish a contact between the electrodes. When circuit 37—38 is closed, electric current is established therein, and this current directly or indirectly excites the electro-magnet 34 to move the valve 32 so as to admit pressure to the other side of piston 27 and thereby cause said piston 27 to carry the electrode on end of rod 26 away from fixed electrode 41 thereby establishing the arc. Should the arc break for any reason, the above described cycle of operation will automatically insure and thereby reëstablish the arc.

The crucible or re-heater 19 serves to receive the molten metal and slag resulting from the reaction; and also to maintain by electrical means the temperature of the molten metal at any desired temperature, as will be explained. The crucible or re-heater 19 consists of an annular compartment 20 communicating with the hearth A at A' and the furnace 22 at 23'. Interlinked with this compartment 20 is the laminated iron ring 42 which in turn is linked with the coil or solenoid 43. The bottom of the annular compartment 20 consists of a V-shaped annular trough 21 for reasons which will presently appear. When the molten metal passes from hearth A into the crucible 19 it falls into the V-shaped annular trough 21 of the compartment 20, and flowing around will form a ring of molten metal. This ring of molten metal will link with the iron ring 42 and thereby be inductively related to the exciting or primary coil 43. When an alternating current of electricity flows in coil 43 it causes to be established a periodic magnet flux in the ring 42; which periodic flux will induce electric currents in the molten metal ring lying at the bottom of the trough 21 and linking with the magnetized ring 42. These induced currents cause heat to be generated within the mass of the molten ring; and by varying the intensity of these induced currents by means of variation of the current flowing in the coil 43 any desired temperature can be maintained in the molten metal. It is important that these secondary or induced currents in the molten metal be made to take place as soon as possible after the molten metal leaves the hearth A; and to bring this about it is important that the molten metal flows around and forms a closed ring in the trough 21 as soon as possible after having entered the re-heater 19. The V-shaped trough 21 of the compartment 20 allows a ring of molten metal to form with a very small cross section, and consequently with only a small quantity of metal; and the V-shaped trough by allowing the molten metal to form a closed ring with only a small quantity of metal, will thereby allow this ring to form as early as possible after the molten metal starts to enter the re-heater; and as the induced electric currents are established immediately upon the formation of this closed ring, and as it is plain that the V-shaped trough 21 expedites the formation of this molten metal ring, it follows that the V-shaped trough 21 is the means of allowing heat to be supplied to the molten metal at as early as possible a moment after the molten metal enters the crucible or re-heater 19,—this heat being supplied as above described by electrical means.

The joints between rotating and fixed members of this furnace are gas tight, and this condition is obtained by means of the elastic cylinder 15 which turns with the hearth A and the hollow metallic frame 16 which is built into and forms an opening to crucible 19. The elastic cylinder is composed of a series of metallic rings which are frustums of very flat cones and rivedted together as shown in Fig. 5. One end of this elastic cylinder is attached to the shell of the hearth and the other end terminates in a ring with a planed face. This ring abuts against and slides upon a corresponding planed face on the hollow frame 16. Any relative displacement between rotating and fixed members of this furnace, due to changes of temperature or other causes, is compensated for by corresponding changes in the length of the elastic cylinder 15 and thereby any separation between rotating and fixed members is prevented and the permanency of gas tight joint accomplished.

The crucible or re-heater 19 is mounted upon a frame C by means of the arch B. The frame C is carried by rollers 44 which rest upon the rails 45. The rails 45 are slightly inclined to insure a tendency on the part of the re-heater to move toward the hearth. The jack screws 40 serve to move the re-heater away from hearth to allow of inspection and repairs in hearth and re-heater.

No form of rotating means for rotating the tubular hearth A has been shown, such construction being well known and the means for rotating the same being a necessary adjunct.

The application covering the process of hydro-electric smelting effected by this apparatus, is the subject matter of a co-pending application filed even date herewith, Serial No. 712,742.

What is claimed is:—

1. In a smelting furnace, the combination of a reheater or crucible, an electrically heated hydrogen supplying furnace in communication therewith, a rotatably mounted tubular hearth in communication with the re-heater, a charging means for supplying ore to the hearth, and a hydrogen retriever in communication with the charging end of the hearth.

2. The combination with a hearth, and a re-heater or crucible, of a column in communication with said re-heater for supplying hydrogen to the re-heater and hearth, electrodes mounted in said column for heating the hydrogen supplied therethrough to a temperature above that required to melt the ore charge, and a hydrogen retriever at the opposite end of the hearth from the re-heater for retrieving the hydrogen passing through the hearth.

3. The combination with a rotatably mounted and inclined tubular hearth, a charging means connected to the upper end thereof, and a re-heater mounted at the lower end of the hearth, of means for supplying heated hydrogen to the reheater and hearth, and means for retrieving the surplus hydrogen after passing through the hearth.

4. The combination with a rotatably mounted and inclined tubular hearth, means for charging the upper end of said hearth, and a re-heater mounted at the lower end of said hearth, of means for supplying hydrogen to the re-heater and hearth, means for producing an electric arc within the current of hydrogen passing through said supplying means, as the hydrogen is permitted to flow through the re-heater and hearth, and means for retrieving the surplus hydrogen after passing through the hearth.

5. The combination with a rotatably mounted and inclined tubular hearth, charging means connected to the upper end thereof, and a re-heater mounted at the lower end of said hearth, of means for supplying heated hydrogen to the re-heater and hearth, and means for retrieving the hydrogen that failed to react and for condensing the steam caused by the action of the heated hydrogen upon the charge in the hearth after the passing thereof through the hearth.

6. The combination with a rotatably mounted and inclined tubular hearth, a re-heater into which the lower end of said hearth empties, and means for supplying ore to the upper end of said hearth, of means for supplying heated hydrogen as a reactive agent to the re-heater and hearth, said means having a vertically disposed conducting column with a channel therethrough and in communication with the re-heater, means for supplying hydrogen to the upper end of said column and to the re-heater and hearth, and a pair of coacting electrodes disposed within the channel of the column for producing an electric arc therein.

7. The combination with a rotatably mounted and inclined tubular hearth, a re-heater into which the lower end of said hearth empties, and means for supplying ore to the upper end of said hearth, of means for supplying heated hydrogen as a reactive agent to the re-heater and hearth, said means having a vertically disposed conducting column with a channel therethrough and in communication with the re-heater, means for supplying hydrogen to the upper end of said column and to the re-heater and hearth, a pair of electrodes disposed within the channel of the column for producing an electric arc therein, one of said electrodes being movable with relation to the other, and means for moving the same to make and break the connection with the fixed electrode to produce an electric arc within the column.

8. The combination with an electrically heated crucible, a rotatably and inclinedly mounted hearth operably disposed with relation thereto and having its lower end emptying into said crucible, and means for charging said hearth disposed at the upper end thereof, of electrically operated mechanism for supplying heated hydrogen to and through said crucible and hearth.

9. The combination with an electrically heated crucible, a rotatably and inclinedly mounted hearth operably disposed with relation thereto and having its lower end emptying into said crucible, and means for charging said hearth disposed at the upper end thereof, of an electric furnace for heating and directing hydrogen to and through said crucible and hearth, and means for retrieving the hydrogen that failed to react during its passage through the hearth.

10. The combination with an electrically heated crucible, a rotatably and inclinedly mounted hearth operatively disposed with relation thereto and having its lower end emptying into said crucible, and means for charging said hearth disposed at the upper end thereof, of an electric furnace for heating and directing hydrogen to and through said crucible and into the lower end of the hearth, and a retriever disposed at the upper charging end of the hearth for receiving the hydrogen passing therefrom.

11. The combination with an electrically heated crucible, a rotatably and inclinedly mounted hearth operably disposed with relation thereto and having its lower end emptying into said crucible, and means for charging said hearth disposed at the upper end thereof, of an electric furnace for heating and directing hydrogen to and through said crucible and into the lower end of the hearth, a conduit leading from the charging end of the hearth, means for retrieving the hydrogen passing therefrom, and a supply conduit for the furnace leading from the retrieving means.

12. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for coactive operation with said stationary electrode to produce an arc within the chamber, and means for actuating said movable electrode to form connection and an arc with relation to the stationary electrode.

13. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, and means for retrieving the hydrogen passing through the hearth.

14. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, and pneumatically operated means for actuating said movable electrode.

15. The combination with an annular crucible or re-heater, means for electrically heating the same, an inclined tubular and rotatable hearth, having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, pneumatically operated means for actuating said movable electrode, and means for retrieving the hydrogen after passage through the hearth.

16. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, a cylinder, a piston mounted in said cylinder and operably connected to the movable electrode, and a valve for controlling the passage of a motive fluid to said cylinder for actuating the piston and movable electrode.

17. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, a cylinder a piston mounted in said cylinder and operably connected to the movable electrode, a valve for controlling the passage of a motive fluid to said cylinder for actuating the piston and movable electrode, and means for retrieving the hydrogen after passage through the hearth.

18. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode, to produce an arc within the chamber, means for actuating said movable electrode to form connection and an arc with relation to the stationary electrode, electro-fluid actuated means for controlling the movable electrode a valve for controlling the admission of pressure fluid to operate the movable electrode, and electro-magnetically operated means for actuating said valve.

19. The combination with an annular crucible or re-heater, means for electrically heating the same, an inclined tubular and rotatable hearth having its lower end in communication with said crucible, and means for charging said hearth disposed at the upper end thereof, of means for supplying hydrogen to the crucible and hearth, comprising a chamber in communication with the crucible, means for supplying hydrogen to said chamber, a stationary electrode mounted within said chamber, a movable electrode disposed for co-active operation with said stationary electrode to produce an arc within the chamber, means for actuating said movable electrode to form connection and an arc with relation to the stationary electrode, electro-fluid actuated means for controlling the movable electrode, a valve for controlling the admission of pressure fluid to operate the movable electrode, electro-magnetically operated means for actuating said valve, and means for retrieving the hydrogen after passage through the hearth.

20. The combination with a rotatably mounted and inclined tubular hearth, means mounted at the upper end thereof for charging said hearth, a re-heater or crucible into which the lower end of the hearth discharges, of means for moving the re-heater or crucible toward and away from the discharge end of the hearth, and means for supplying hydrogen to the crucible and hearth bodily carried by the re-heater or crucible.

21. In a smelting furnace, the combination of a reheater or crucible, an electrically heated hydrogen supplying furnace in communication therewith, a rotatably mounted tubular hearth in communication with the reheater, a charging means for supplying ore to the hearth, a hydrogen gas receiver in communication with the charging end of the hearth, and a steam condenser also in communication with the charging end of the hearth.

In testimony that I claim the foregoing as my own, I have hereto affixed my signature in the presence of two witnesses.

ANTONIO TOMMASINI.

Witnesses:
S. McLaren,
Ernest Armstrong.